US008554640B1

(12) United States Patent
Dykstra et al.

(10) Patent No.: US 8,554,640 B1
(45) Date of Patent: Oct. 8, 2013

(54) CONTENT COMPLETION RECOMMENDATIONS

(75) Inventors: Aaron James Dykstra, Federal Way, WA (US); Laura Ellen Grit, Seattle, WA (US); Tom Killalea, Seattle, WA (US); James C. Petts, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 359 days.

(21) Appl. No.: 12/859,662

(22) Filed: Aug. 19, 2010

(51) Int. Cl.
*G06Q 30/00* (2012.01)
(52) U.S. Cl.
USPC ............... 705/26.7; 705/14.49; 705/319
(58) Field of Classification Search
USPC ............... 705/14.4, 14.49–14.53, 14.59, 705/14.64–14.67, 14.73, 26.1–27.2, 51–59, 705/319
See application file for complete search history.

(56) References Cited

U.S. PATENT DOCUMENTS

| 5,663,748 | A | 9/1997 | Huffman et al. |
| 5,697,793 | A | 12/1997 | Huffman et al. |
| 5,743,746 | A | 4/1998 | Ho et al. |
| 6,098,064 | A | 8/2000 | Pirolli et al. |
| 6,544,294 | B1 | 4/2003 | Greenfield et al. |
| 6,584,480 | B1 | 6/2003 | Frerrel et al. |
| 6,947,922 | B1 | 9/2005 | Glance |
| 6,963,848 | B1 | 11/2005 | Brinkerhoff |
| 7,103,848 | B2 | 9/2006 | Barsness et al. |
| 7,315,826 | B1 | 1/2008 | Guheen et al. |
| 7,552,068 | B1 * | 6/2009 | Brinkerhoff ............... 705/7.32 |
| 8,103,665 | B2 * | 1/2012 | Abbott et al. ............... 707/729 |
| 2001/0007980 | A1 | 7/2001 | Ishibashi et al. |
| 2001/0049623 | A1 * | 12/2001 | Aggarwal et al. ............ 705/14 |
| 2003/0225609 | A1 | 12/2003 | Klipfell, III |
| 2004/0181746 | A1 | 9/2004 | McLure et al. |
| 2005/0027671 | A1 | 2/2005 | Hind et al. |
| 2005/0071864 | A1 | 3/2005 | Denoue et al. |
| 2005/0267861 | A1 | 12/2005 | Jassin et al. |
| 2006/0041538 | A1 | 2/2006 | King et al. |
| 2006/0122716 | A1 | 6/2006 | Bortnik et al. |
| 2006/0229944 | A1 | 10/2006 | Walker et al. |
| 2006/0287046 | A1 | 12/2006 | Walker et al. |
| 2007/0043817 | A1 * | 2/2007 | Oliver et al. ............... 709/206 |
| 2007/0061755 | A1 | 3/2007 | Taboada et al. |
| 2008/0077492 | A1 | 3/2008 | Ho et al. |
| 2008/0136838 | A1 | 6/2008 | Goede et al. |
| 2008/0141182 | A1 | 6/2008 | Barsness et al. |
| 2008/0162206 | A1 | 7/2008 | Mak et al. |
| 2008/0201348 | A1 | 8/2008 | Edmonds et al. |
| 2008/0249893 | A1 * | 10/2008 | Knoll et al. ............... 705/27 |
| 2008/0263014 | A1 * | 10/2008 | Garijo Mazario et al. ........ 707/3 |
| 2008/0288862 | A1 | 11/2008 | Smetters et al. |
| 2009/0024621 | A1 * | 1/2009 | Burgess et al. ............... 707/6 |

(Continued)

OTHER PUBLICATIONS

Waiting for Netflix's Plot to Advance: [Final Edition] Musgrove, Mike. The Washington Post [Washington, D.C] Oct. 28, 2007: F.1.*

(Continued)

*Primary Examiner* — William Allen
(74) *Attorney, Agent, or Firm* — Lee & Hayes, PLLC

(57) ABSTRACT

User content access events pertaining to a content item, such as an eBook, audio, video file, and so on, are collected and analyzed to determine progress data, including completion information about when the content item, or a portion thereof, has been completed. Once determined, further information or recommendations that have some relation to the completed content item may be presented to the user.

24 Claims, 12 Drawing Sheets

(56) References Cited

U.S. PATENT DOCUMENTS

| | | | |
|---|---|---|---|
| 2009/0031244 A1 | 1/2009 | Brezina et al. | |
| 2009/0070454 A1 | 3/2009 | McKinnon, III et al. | |
| 2009/0083116 A1* | 3/2009 | Svendsen | 705/10 |
| 2009/0089177 A1 | 4/2009 | Dayton et al. | |
| 2009/0156310 A1 | 6/2009 | Fargo | |
| 2009/0300670 A1 | 12/2009 | Barish | |
| 2010/0070899 A1* | 3/2010 | Hunt et al. | 715/769 |
| 2010/0076274 A1 | 3/2010 | Severson | |
| 2010/0169906 A1 | 7/2010 | Takahashi | |
| 2010/0174596 A1 | 7/2010 | Gilman et al. | |
| 2010/0198693 A1* | 8/2010 | Lidwell et al. | 705/14.66 |
| 2010/0275233 A1* | 10/2010 | Soohoo et al. | 725/46 |
| 2010/0306122 A1 | 12/2010 | Shaffer | |
| 2010/0313161 A1 | 12/2010 | Le Chevalier et al. | |
| 2010/0315359 A1 | 12/2010 | Seong et al. | |
| 2011/0050594 A1 | 3/2011 | Kim et al. | |
| 2011/0081867 A1 | 4/2011 | Issa et al. | |
| 2011/0082719 A1 | 4/2011 | Dutta | |
| 2011/0087955 A1 | 4/2011 | Ho et al. | |
| 2011/0191692 A1* | 8/2011 | Walsh et al. | 715/752 |
| 2011/0320276 A1* | 12/2011 | Ray et al. | 705/14.53 |
| 2012/0001923 A1 | 1/2012 | Weinzimmer et al. | |
| 2012/0016772 A1* | 1/2012 | Sadagopan et al. | 705/27.1 |
| 2012/0030227 A1* | 2/2012 | Mital et al. | 707/767 |
| 2012/0041967 A1* | 2/2012 | Askey et al. | 707/769 |

OTHER PUBLICATIONS

Peer Influences on Young Teen Readers an Emerging Taxonomy Howard, Vivian . Young Adult Library Services 8. 2 (Winter 2010): 34-41.*

Pack a bag of books for your summer vacation Lynda MacGibbon People; places; things. The Times—Transcript [Moncton, N.B] Jul. 11, 2008: D.6.*

Discover and Share the Best of the Web with PrkL8 for iPhone: Personalized Web Discovery with Easy Sharing on Facebook Anonymous. PR Newswire [New York] Mar. 31, 2010.*

Next Plan Commission Meeting Taking Place, Aug. 18 US Fed News Service, Including US State News [Washington, D.C] Aug. 18, 2010.* www.youtube.com. Mar. 3, 2009 (Mar. 9, 2009) [recovered from www.Archive.org].*

Carey, "13 Summer reading programs avoid brain drain and get rewards", Examiner.com, Family & Parenting, Jun. 3, 2010, Houston Family Examiner, pp. 1-3.

Hart, "Summer 2009: Summer Reading Progams with a Reward for Kids", Jun. 4, 2009, <<http://voices.yahoo.com>>, pp. 1-3.

Non-Final Office Action for U.S. Appl. No. 12/888,086, mailed on Apr. 16, 2012, Simoina K. Dargan et al., "Content Tracking and Reward Architecture", 19 pages.

Non-Final Office Action for U.S. Appl. No. 12/894,417, mailed on May 25, 2012, Preetha Chatterjee et al., "Finding an End-of-Body Within Content", 21 pages.

Non-Final Office Action for U.S. Appl. No. 13/294,883, mailed on May 8, 2012, Aaron James Dykstra et al., "Content Statistics", 31 pages.

U.S. Appl. No. 12/859,686, filed Aug. 19, 2010, Dykstra, et al., "Content Completion Reports".

U.S. Appl. No. 12/859,705, filed Aug. 19, 2010, Dykstra, et al., "Content Completion Activities".

U.S. Appl. No. 12/888,086, filed Sep. 22, 2010, Dargan, et al., "Content Tracking and Reward Architecture".

U.S. Appl. No. 12/894,417, filed Sep. 30, 2010, Chatterjee, et al. "Finding an End-of-Body Within Content".

U.S. Appl. No. 61/375,195, filed Aug. 19, 2010, Dargan, et al., "Content Tracking and Reward Architecture".

"How to Write a Book Review", retrieved on Jan. 25, 2012 at http://web.archive.org/web/20090420124930/http://www.lavc.edu/Library/bookreview.htm, Los Angeles Valley College Library, 4 pages.

Office action for U.S. Appl. No. 12/859,705, mailed on Feb. 3, 2012, Dykstra et al., "Content Completion Activities", 45 pages.

Non-Final Office Action for U.S. Appl. No. 12/859,686, mailed on Feb. 6, 2012, Aaron James Dykstra et al., "Content Completion Reports", 14 pages.

Non-Final Office Action for U.S. Appl. No. 13/294,855, mailed on Oct. 26, 2012, Simoina K. Dargan et al., "Content Rewards ", 28 pages.

Final Office Action for U.S. Appl. No. 12/888,086, mailed on Oct. 26, 2012, Simoina K. Dargan et al., "Content Tracking and Reward Architecture", 24 pages.

Final Office Action for U.S. Appl. No. 12/859,686, mailed on Nov. 9, 2012, Aaron James Dykstra et al., "Content Completion Reports", 17 pages.

Final Office Action for U.S. Appl. No. 12/859,705, mailed on Aug. 15, 2012, Dykstra et al., "Content Completion Activities", 49 pages.

Office action for U.S. Appl. No. 12/894,417, mailed on Sep. 14, 2012, Chatterjee et al., "Finding an End-of-Body Within Content", 27 pages.

* cited by examiner

CONTENT COMPLETION RECOMMENDATIONS

BACKGROUND

A large and growing population of users is consuming increasing amounts of digital content, such as music, movies, audio books, electronic books, executables, and so on. These users employ various electronic access devices to consume such content. Among these access devices are electronic book readers, cellular telephones, personal digital assistants (PDAs), portable media players, tablet computers, netbooks, and the like. As more users consume content items electronically, new opportunities to interact with users are becoming available. In particular, observing and monitoring different user actions present opportunities for more targeted offerings of products and content, at times during which users are more receptive to such offerings.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes an architecture and techniques in which the completion of a content item triggers a process of identifying related or additional information that might interest the user who just completed the content item, and presenting the related or additional information to the user.

A content item may be essentially any form of electronic data that may be consumed on a device, such as a digital book, electronic magazines, music, movies, and so on. A content item may also be composed of multiple smaller portions, such as units, chapters, sections, pages, tracks, episodes, parts, subdivisions, scenes, intervals, periods, modules, and so forth.

Content item consumers, referred to herein as users, may access and render the content items using a wide variety of access devices, such as electronic book readers, cellular telephones, personal digital assistants (PDAs), portable media players, tablet computers, and so forth. With the help of these devices, notifications pertaining to user progress through the content items may be collected, aggregated, and reported. These notifications may indicate when a user has completed a particular content item. Upon completion of a content item, additional information can be presented to the user, relating to the content item that was just completed. For example, when the completed item is an eBook, related items might comprise eBooks having one or more common characteristics with the completed eBook, such as authorship, genre, series, characters, setting, subject matter, topic, sequence, etc. Related items might also comprise non-content items, such as products, merchandise, services, links or references to content or websites, etc.

The suggestions or recommendations may be based on what other users have viewed or obtained after completing the content item, or upon habits and past behavior of the user or other similar users.

For discussion purposes, the architecture and techniques are described in an online context where the content items are retrieved from remote servers and completion information is gathered via an online service. However, the concepts described herein are also applicable in other architectures, such as offline environments.

Content Access Information Architecture

Figure 1:
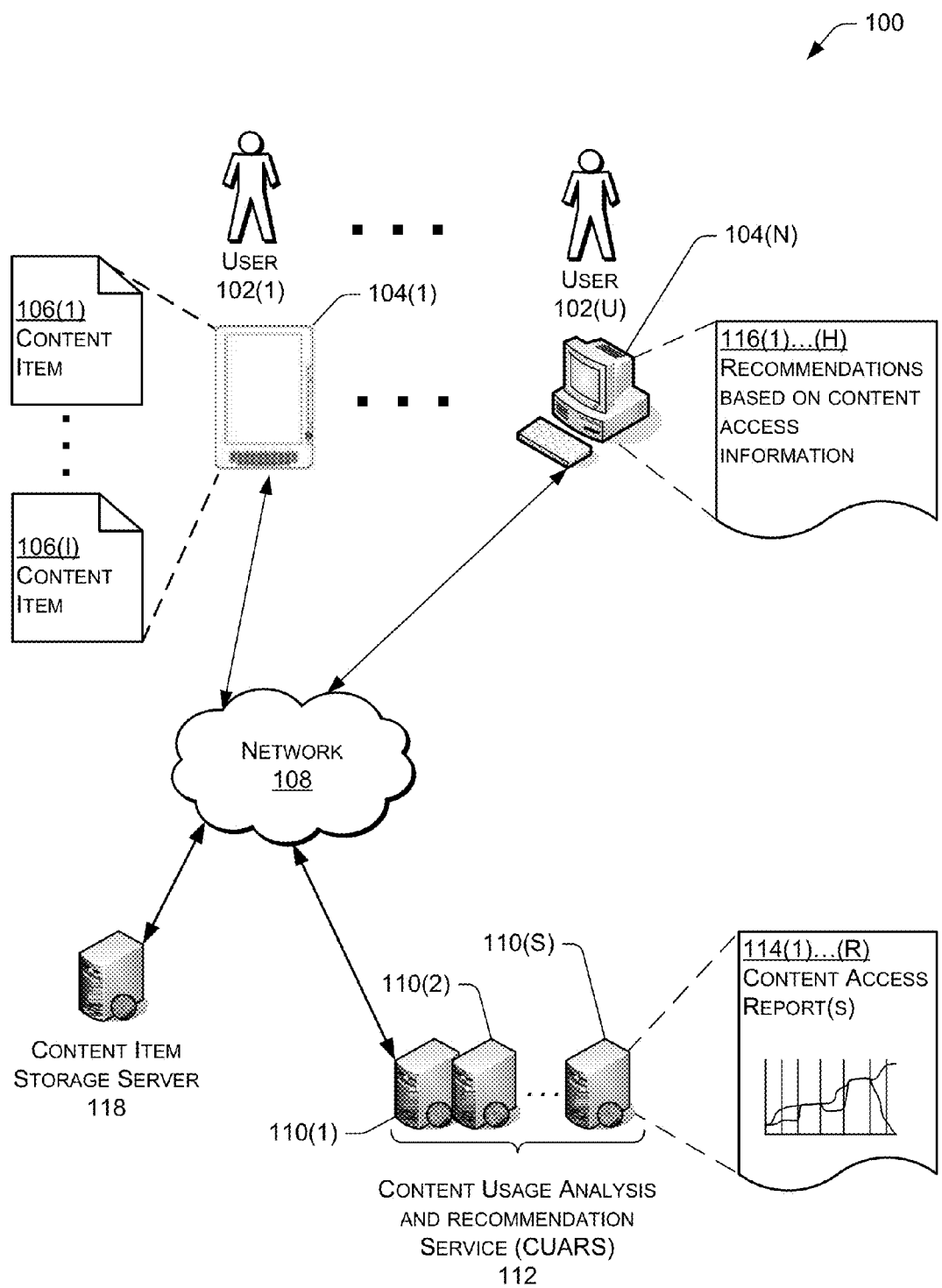
FIG. 1 is an illustrative architecture for collecting completion data and providing recommendations or other information relating to completion of a particular content item.

FIG. 1 shows an illustrative architecture 100 for collecting, reporting, and providing recommendations or other information based on content access information.

Users 102(1), ..., 102(U) are part of a population of people that utilize the architecture 100. The users consume a wide variety of content items, such as books, magazines, music, movies, and so on. As used herein, letters within parentheses, such as "(U)" or "(N)", indicate any integer number greater than zero.

Each representative user 102(1), ..., (U) employs one or more corresponding electronic access devices 104(1), ..., 104(N) to enable consumption of the content items. For instance, the user 102(1) uses an electronic book ("eBook") reader device 104(1) to read digital textual material, such as electronic books, magazines, and the like. The user 102(U) employs a computer 104(N) to enjoy any number of content items, such as watching a movie, or listening to audio, or reading electronic text-based material. While these example devices are shown for purposes of illustration and discussion, it is noted that many other electronic devices may be used, such as laptop computers, cellular telephones, portable media players, tablet computers, netbooks, noteBooks, desktop computers, gaming consoles, DVD players, media centers, and the like.

The content items 106(1), ..., 106(I) are accessible from any of the access devices 104(1), ..., 104(N). The content items may be stored locally or accessible from a remote location over a network. As illustrated, the access devices 104(1), ..., 104(N) may be connected to a network 108 to access and retrieve the content items 106(1), ..., 106(N). The network 108 may be any type of communication network, including the Internet, a local area network, a wide area network, a wireless wide area network (WWAN), a cable television network, a wireless network, a telephone network, combinations of the foregoing, etc. The network 108 allows communicative coupling between the access devices 104(1), ..., 104(N) and remote servers, such as network resource servers 110(1), 110(2), ..., 110(S). Of particular note, individual ones of the access devices 104(1), ..., 104(N), such as the eBook reader device 104(1), may be equipped with a wireless communication interface that allows communication with the servers 110 over a wireless network. This allows information collected by the eBook reader device 104(1) (or other access devices) pertaining to consumption of content items to be transferred over the network 108 to the remote servers 110(1), ..., 110(S).

The network resource servers 110(1), ..., 110(S) may collectively have processing and storage capabilities to receive data from the access devices 104(1), ..., 104(N), process the data, and respond to requests for analysis and reporting. The servers 110(1), ..., 110(S) may be embodied in any number of ways, including as a single server, a cluster of servers, a server farm or data center, and so forth, although other server architectures (e.g., mainframe) may also be used.

The network resource servers 110(1), ..., 110(S) may be configured to host a content usage analysis and recommendation service (CUARS) 112. The CUARS 112 collects data pertaining to user interaction with the content items. In the illustrated embodiment, as will be described in more detail below, the user interactions are recorded in data items referred to as content access events (CAEs).

The CUARS 112 may be configured to receive such data from the access devices 104(1), ..., 104(N), or might otherwise capture data indicative of an access device's attempts to access or consume the content items. The CUARS 112 then processes and analyzes the content access events, and uses them to generate content access reports 114(1), ..., 114(R) as well as general content access information. This information may be used to generate user consumption metrics, derive completion information and statistics, and generate recommendations based on such metrics and statistics. The metrics and recommendations may be reported back to the users. As an example, as illustrated in FIG. 1, recommendations 116(1), ..., 116(H) are reported to the user 102(U).

Content items may be stored locally on the access device 104, or retrieved from a content item storage server 118 or other network resources, which may be accessed via the network 108. The content item storage server 118 may store or otherwise have access to content items that can be presented on the access devices 104(1), ..., 104(N). The server 118 may have processing and storage capabilities to receive requests for content items and to facilitate purchase and/or delivery of those content items to the access devices 104(1), ..., 104(N). In some implementations, the server 118 may store the content items, although in other implementations the server merely facilitates access to, purchase, and/or delivery of those content items. The server 118 may be embodied in any number of ways, including as a single server, a cluster of servers, a server farm or data center, and so forth, although other server architectures (e.g., mainframe) may also be used.

Alternatively, the content items 106(1), ..., 106(N) may be made available to the access devices 104(1), ..., 104(N) through offline mechanisms. For instance, content items may be preloaded on the devices, or the content items may be stored on portable media that can be accessed by the devices. For instance, electronic books and/or magazines may be delivered on portable storage devices (g., flash memory) that can be accessed and played by the access devices.

In one example of this architecture in use, suppose the user 102(1) authorizes collection of access data and accesses an eBook. As the user 102(1) turns the pages, highlights passages, adds annotations, etc., data about the user's interaction with the eBook is collected by the eBook reader 104(1). This may include time spent on each page, details about annotations, geographic location, motion during access, and so forth.

At some point, the user 102(1) finishes reading the eBook, and the completion of the eBook is detected based on the user interaction data. CUARS 112, access device 104(1), or both, may then identify or retrieve further information that the user may find helpful or valuable at the time of completing the eBook. The further information might consist of supplemental information relating to the just-completed eBook, such as links or citations to background materials or other resources related to the eBook or to the subject matter of the eBook. Alternatively, the further information might consist of listings of merchandise related to the eBook or its subject matter, presented in a format that allows the user to easily purchase different merchandise items.

Other information, in which a user might be interested upon completion of an eBook, might include additional eBooks or other content items that are in some way related to the eBook that has just been completed. For example, device 104(a) may present a listing of eBooks or other content items having common authorship with the just-completed eBook. In the situation where the completed eBook is part of a set or series of related works, device 104(a) may recommend or suggest another book in the series, or the next sequential book in the series. Alternatively, device 104(a) may recommend additional content items based on similarities to the completed eBook, or based on historical activities of the user or of other similar users.

For more information on techniques for identifying recommendations, the reader is directed to the following three issued patents: U.S. Pat. No. 6,266,649 entitled "Collaborative Recommendations Using Item-to-Item Similarity Mappings"; U.S. Pat. No. 6,912,505 entitled "Use of Product Viewing Histories of Users to Identify Related Products"; and U.S. Pat. No. 7,412,442 entitled "Identifying Items Relevant to a Keyword". The reader is also directed to U.S. patent application Ser. No. 12/485,700, filed Jun. 16, 2009, entitled "Person To Person Similarities Based on Media Experiences".

The additional information may be presented in the form of recommendations for further reading or recommendations for other products or content items in which the user may have an interest. Recommendations may be ranked according to complexity, interest level, how long a content item has been awaiting consumption, or other factors.

Example Access Device

Figure 2:
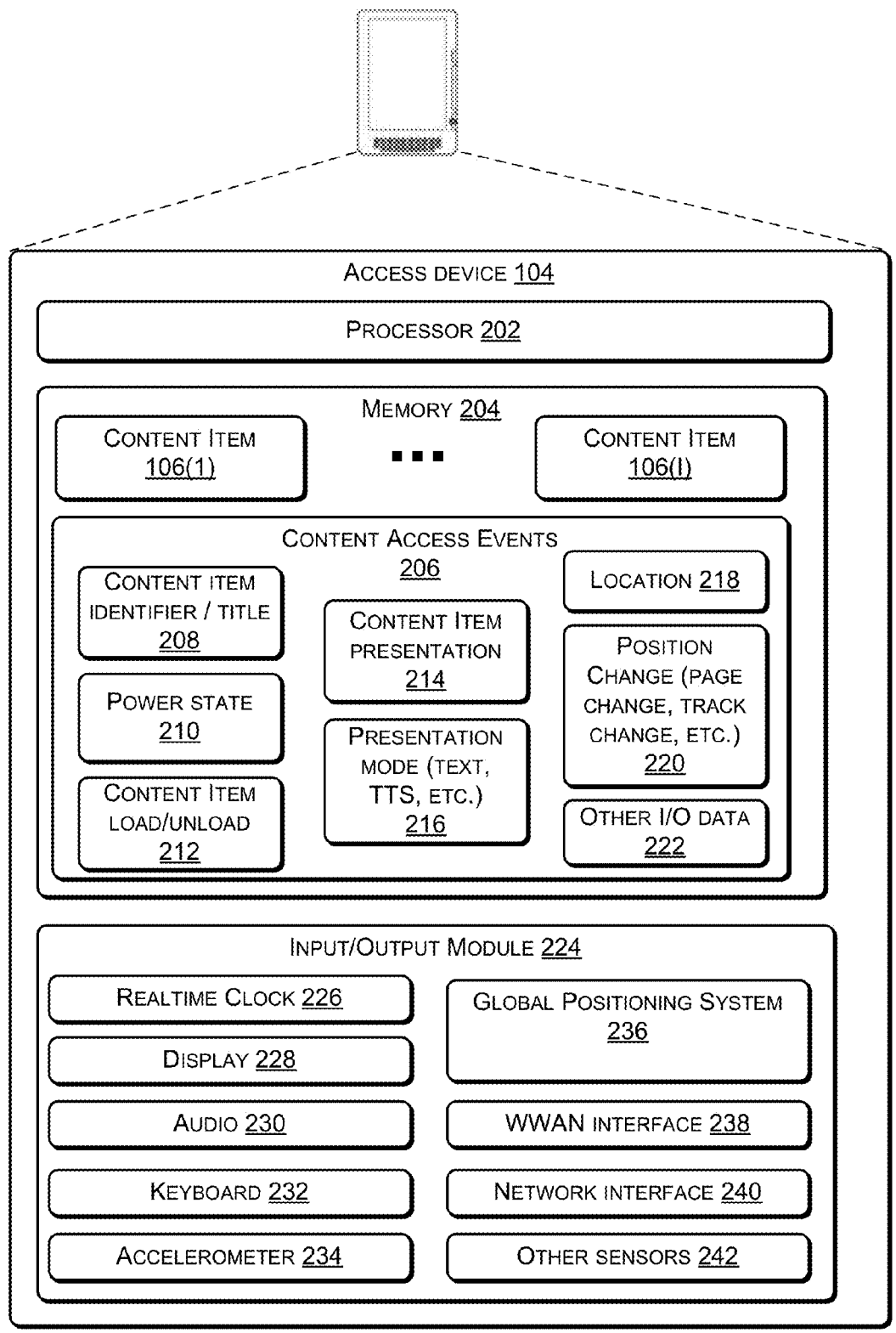
FIG. 2 is a block diagram illustrating selected modules in an access device of FIG. 1 that retrieves and presents content items.

FIG. 2 shows selected modules in an illustrative access device 104 from FIG. 1. The access device 104 includes one or more processors 202 configured to execute instructions and access data stored in memory 204. The memory 204 is representative of computer-readable storage that may be implemented as volatile and/or non-volatile memory. The combination of the processors 202 and the memory 204 embody operational logic that is functional to perform the actions and processes that are attributed herein to access devices 104.

Content items 106(1), ..., 106(N) may be stored in the memory 204 (as shown) or otherwise accessed by the access device 104 for consumption. For example, an electronic book reader may render pages of an electronic book on a display for viewing, or an electronic player device may play audible sounds from a music track for listening.

During access of the content items 106(1), ..., 106(N), the access device 104 generates content access events (CAEs)

206 that generally pertain to data associated with accessing the content items 106(1), . . . , 106(N). The CAEs 206 may manifest as various forms of data, such as access device status, flags, events, user inputs, etc. In some implementations, the CAEs 206 may be stored in the memory 204 (as shown) and/or stored remotely (e.g., in memory of the CUARS 112). While many CAEs may be available, in some implementations only selected CAEs may be stored. In one particular implementation (as illustrated in FIG. 2), the CAEs 206 may include:

- A content item identifier 208, such as title, identification number, alphanumeric string, etc.
- A power state 210 that indicates which components of the access device 104 are active. For example, whether network interfaces or radios are on, off, or in sleep mode during access of a content item 106.
- A load and/or unload state 212 to indicate whether a content item 106 is loaded into the memory 204. The endpoints of the load or unload may also be stored, as well as whether the user retrieved a content item 106 from external storage and stored in the memory 204, or vice versa.
- A content item presentation state 214 to indicate when a content item 106 is accessed by the user for display, playback, etc.
- A presentation mode 216 that specifies various modes, such as orientation of display, whether textual data was read using a text-to-speech (TTS) feature, translated, etc.
- A location 218 of the access device when it accessed the content, including venue (e.g., airplane, night club, etc.), specific geolocation, or both.
- A position change 220 in the content item during access. For example, the user 102(1) might read every chapter of a book in sequential order, but watch a scene from the middle of a movie.
- Other input/output data 222 that may be captured and stored by the access device 104. For example, accelerometer data may be included to determine when the user was in motion during consumption of content.

The access device 104 further includes a set of input/output devices grouped within an input/output module 224, which may be used to provide the input/output data 222 or other information in the CAEs 206. Relevant input/output devices include:

- A real-time clock 226 to provide date and time. This clock may be used to compute time-based CAE, such as when a content item is accessed, or how long a user remains in a section of the content item.
- One or more displays 228 to present content items visually to the user, and optionally act as an input where a touch-sensitive display is used.
- An audio device 230 to provide audio input and/or output of content items.
- A keyboard 232 to facilitate user input and may include pointing devices such as a joystick, mouse, touch screen, control keys, etc.
- An accelerometer 234 to generate orientation and relative motion input. For example, this may be used to determine orientation of the access device 104 during consumption of a content item.
- A global positioning system (GPS) 236 to enable determination of geolocation, time data, velocity, etc. The GPS 236 may be used to generate position or location-based CEAs that may be used to help determine where user behavior occurs. The location of a user may also be used as the basis of recommendations provided to a user.
- A wireless wide-area network (WWAN) 238 to provide a communication connection to the network 118.
- A network interface 240 to facilitate a local wired or wireless communication connection to the network 118, and may be used to identify and track particular wireless networks to which the electronic device connects.
- Other sensors 242, which may include ambient light level sensors, barometric pressure, temperature, user biometrics, etc.

Example Server

Figure 3:
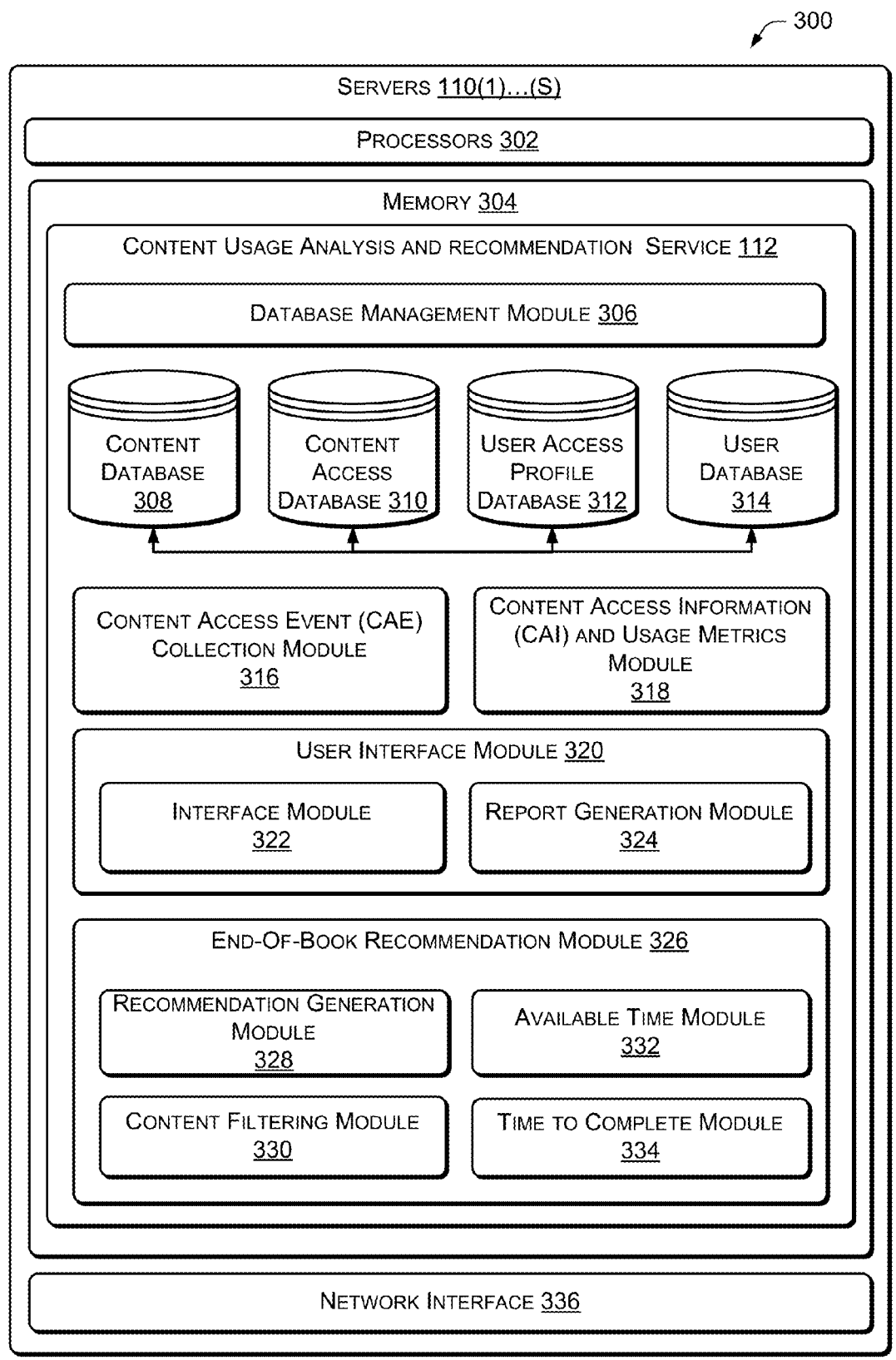
FIG. 3 is a block diagram illustrating selected modules in a server system used to host a content usage analysis and recommendation service, as shown in the architecture of FIG. 1.

FIG. 3 shows selected modules 300 in the system of servers 110(1) . . . , 110(S) used to host the CUARS 112, as shown in the architecture of FIG. 1. The server system includes the processors 302 that execute instructions and access data stored in a memory 304. The memory 304 implements a computer-readable storage media that may include, for example, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a processor.

Selected modules are shown stored in the memory 304. These modules provide the functionality and operational logic to implement the CUARS 112. One or more databases may reside in the memory 304. A database management module 306 is configured to place data in, and retrieve data from, the databases. In this example, four databases are shown, including a content database 308, a content access database 310, a user access profile database 312, and a user database 314. Although shown as contained within the memory 304, these databases may also reside separately from the servers 110(1), . . . , 110(S), but remain accessible to them. The first three databases 308-312, and selected items of data stored therein, are discussed in more detail below with reference to FIGS. 4-6. The user database 314 may include information such as user name, age, gender, social affiliations, geolocation, demographics, etc.

A content access event (CAE) collection module 316 may also be stored in memory 304. The CAE collection module 316 is configured to gather content access event data from access devices 104(1), . . . , 104(N). As described above with respect to FIG. 2, the CAEs include access device status, flags, events, and user inputs. For example, the CAE collection module 316 may gather a set of CAEs from the access device 104(1) indicating that the item "To Serve Mankind" was last displayed two months ago for a period of ten minutes in a landscape presentation mode while on an airplane at an altitude of 31,000 feet and speed of 513 miles per hour. Furthermore, the user only accessed seven pages of material during that time before switching to TTS presentation.

A content access information (CAI) and usage metrics module 318 may be stored in the memory 304 and configured to generate CAI statistics from the CAE data collected by the CAE collection module 316 and to derive content usage metrics from the CAI and CAE data. CAI is described in more detail below with reference to FIG. 5. In another implementation, the access device 104 may process the CAEs 206 to produce CAI or an intermediate data set, resulting in a smaller set of data for transmission over network 108 and/or to reduce processing load on the CUARS 112.

A user interface module 320 may be stored in the memory 304 to allow the user to configure CAI settings and to present usage metric reports and recommendations to the user. The interface module 320 includes a user interface (UI) module 322 and a report generation module 324. The UI module 322 is configured to provide the user with controls and menus suitable to access the content access information and recommendations. The report generation module 324 is configured to transform the CAI and recommendations into selected formats and representations for presentation to content consumers and other users.

An end-of-book recommendation module 326 may also reside at the server system 110 and be stored in the memory 304. The end-of-book recommendation module 326 includes a recommendation generation module 328 that generates recommendations to be presented to a user when the user reaches the end of an eBook or other content, or is otherwise judged to have completed the content. For example, completion may be assumed when the user reaches the last page of an eBook or when the user navigates through the majority of a content item and subsequently navigates away from the content item.

The recommendations generated by the recommendation generation module 328 can be based in part on the usage metrics derived from the content access events and the content access information during access of a content item. Recommendations may also indicate content items that have some implicit or explicit relationship to the content that has just been completed, such as might exist between items of a trilogy or other series, or between other works by the same author or authors.

The recommendation generation module 328 may also identify recommendations based on observations of the user's past behavior or of the behavior of other users in similar situations, such as by determining what other users have purchased after completing a particular eBook, or by comparing habits and preferences of the user with those of other users.

The recommendations may be for other content items, different portions of the same content item, advertisements, services, merchandise, resources and so on.

Figure 7:
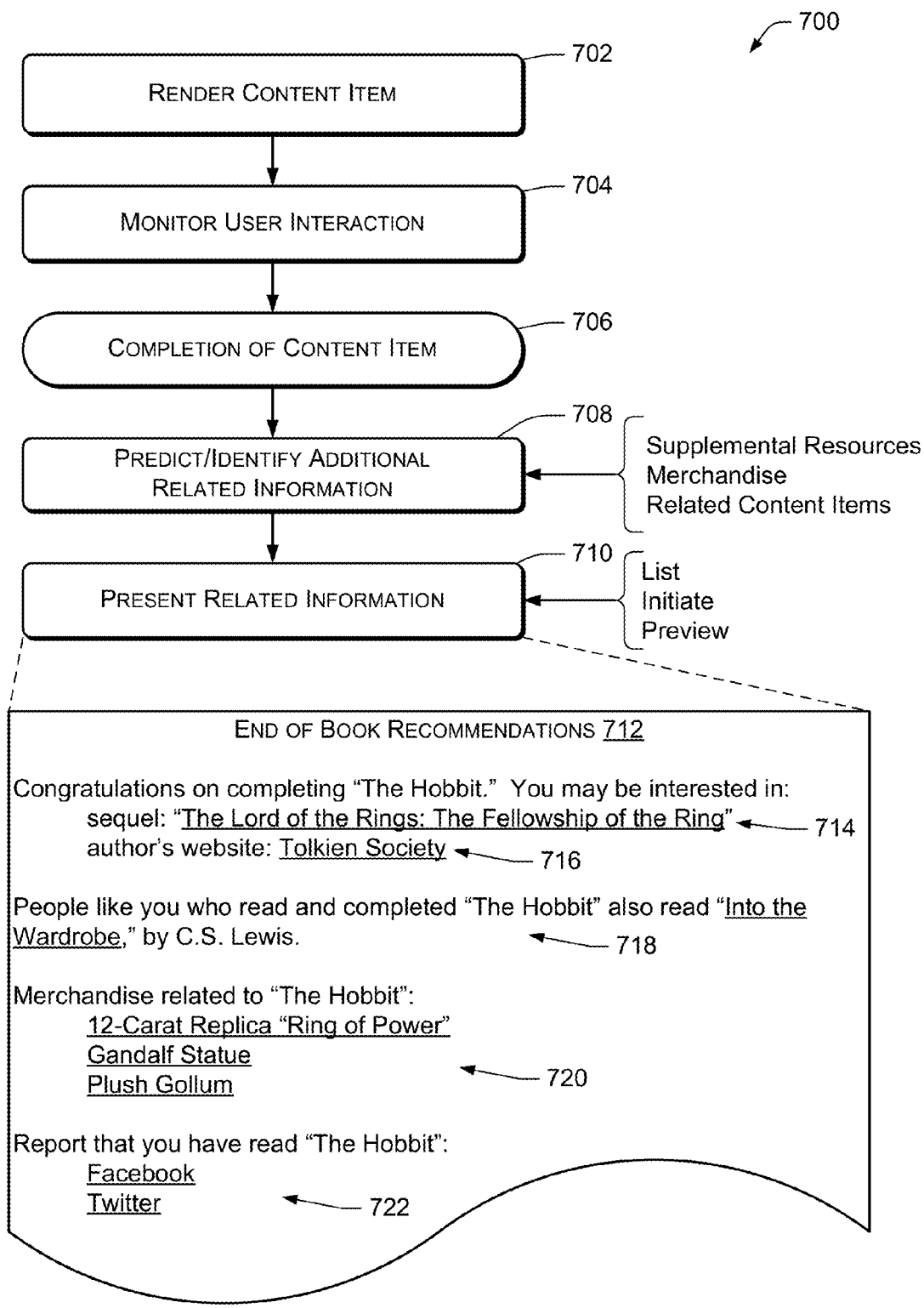
FIG. 7 is a flow diagram of an illustrative process of presenting related or additional information to a user upon completion of a content item.

Further techniques for identifying and presenting related content items and other information, which can be used in conjunction with the techniques described herein, are described in subsequent sections of this discussion, particularly in the discussion relating to FIG. 7.

The end-of-book recommendation module 326 may include a content filtering module 330 configured to filter recommendations based on whether they comply with criteria designated by the user. For example, a user may wish to view only recommendations relating to a particular genre, such as mysteries. Additionally, the filtering module 330 may filter based on other factors, such as by removing recommendations to content items that the user has already consumed, omitting content items that other users have abandoned at a comparatively higher rate, or selectively omitting content items based on age appropriateness. Other filtering criteria may include whether the potential recommendations have one or more of the same contributors (author, illustrator, editor, etc.) as the just-completed content item, whether the potential recommendations have the same publisher as the just-completed content item, or whether the potential recommendations are of the same genre as the just-completed content item. Filtering may also be based upon specific interests indicated by the user, such as whether potential recommendations are on a user's wishlist or "hope-to-read" list. The end-of-book recommendation module 326 may further include an available time module 332 that is configured to determine, from the content access information, a quantity of time available for a user to consume one or more content items. End-of-book recommendations can then be based on this information.

For instance, suppose the user has 45 minutes in an airport before boarding the plane. The available time module 332 may automatically discern the amount of time available to the user for an access session (e.g., from the user's calendar, or itinerary), or may query the user and receive direct feedback as to available time. In response, the end-of-book recommendation module 326 may recommend content items that are suitable for 45 minutes, such as a short book of poems, or a sitcom video program.

A time to complete module 334 can also provided as part of the end-of-book recommendation module 326. The time to complete module 334 determines, based on the user's consumption metrics, a quantity of time that the user will most likely need to consume a content item. For instance, the time to complete module 334 may ascertain that the user typically reads a book at a rate of 250 words per minute. If the user has 25,000 words left in the book, the time to complete module 334 determines that the user will mostly like finish the book with 100 minutes of reading.

The server system 110 may also be equipped with a network interface 336, which provides a local wired or wireless communication connection to the network 108. The network interface 336 allows for communication with the access devices 104 via the network 108, as shown in FIG. 1.

Figure 4:
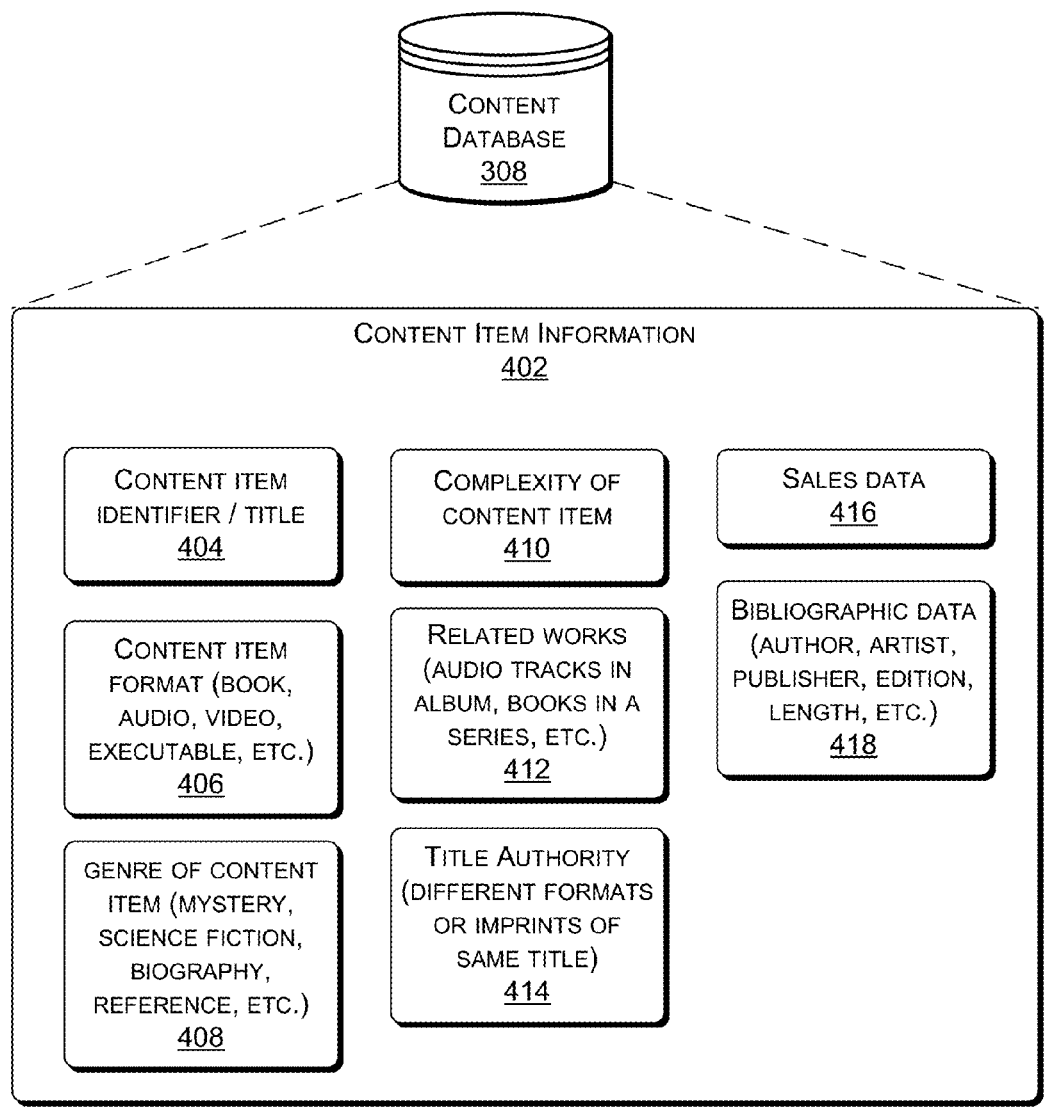
FIG. 4 shows an illustrative content database of FIG. 3, which may be used to store content items to be retrieved by the access devices.

FIG. 4 shows an illustrative content database 308 maintained at, or accessible by, the servers 110(1), . . . , 110(S) of FIG. 3. The content database 308 is configured to contain content item information 402, which includes information pertaining to content items that a user may wish to access and consume. For discussion purposes, the content item information 402 may include the following:

Content item identification 404, such as title, identification number, invariant reference number, etc.

Content item format 406, such as whether the content item is available as a book, audio, video, executable program, etc.

Genre of content item 408, such as mystery, science fiction, biography, horror, reference, game, utility, etc.

Complexity of content item 410. For example, in textual content items, complexity may be determined based on a measure of readability. Examples of readability measurement include a Flesch-Kincaid Readability score, assessment of reading grade level, the mean and variance of reading velocity, frequency of dictionary lookups, or other metrics which may be used to ascertain the relative intricacy of the content item, or a combination of these measurements. Complexity of other types of content items may be determined by other suitable metrics. For example, a musical piece may have complexity determined by spectral analysis, or an executable may have complexity determined by the size of the code and number of possible user inputs during use. In another implementation, complexity may be derived from user feedback.

Related works 412, such as music tracks found in the same album, books in a series, movies by the same director, etc.

Title authority 414, which links or associates multiple instances of the same work or set of works (e.g., different formats or imprints of the same title).

Sales data 416, such as historical sales data, quantities sold/licensed, profit margin, returns, etc.

Bibliographic data 418, such as author, artist, publisher, edition, length, catalog number, etc.

Figure 5:
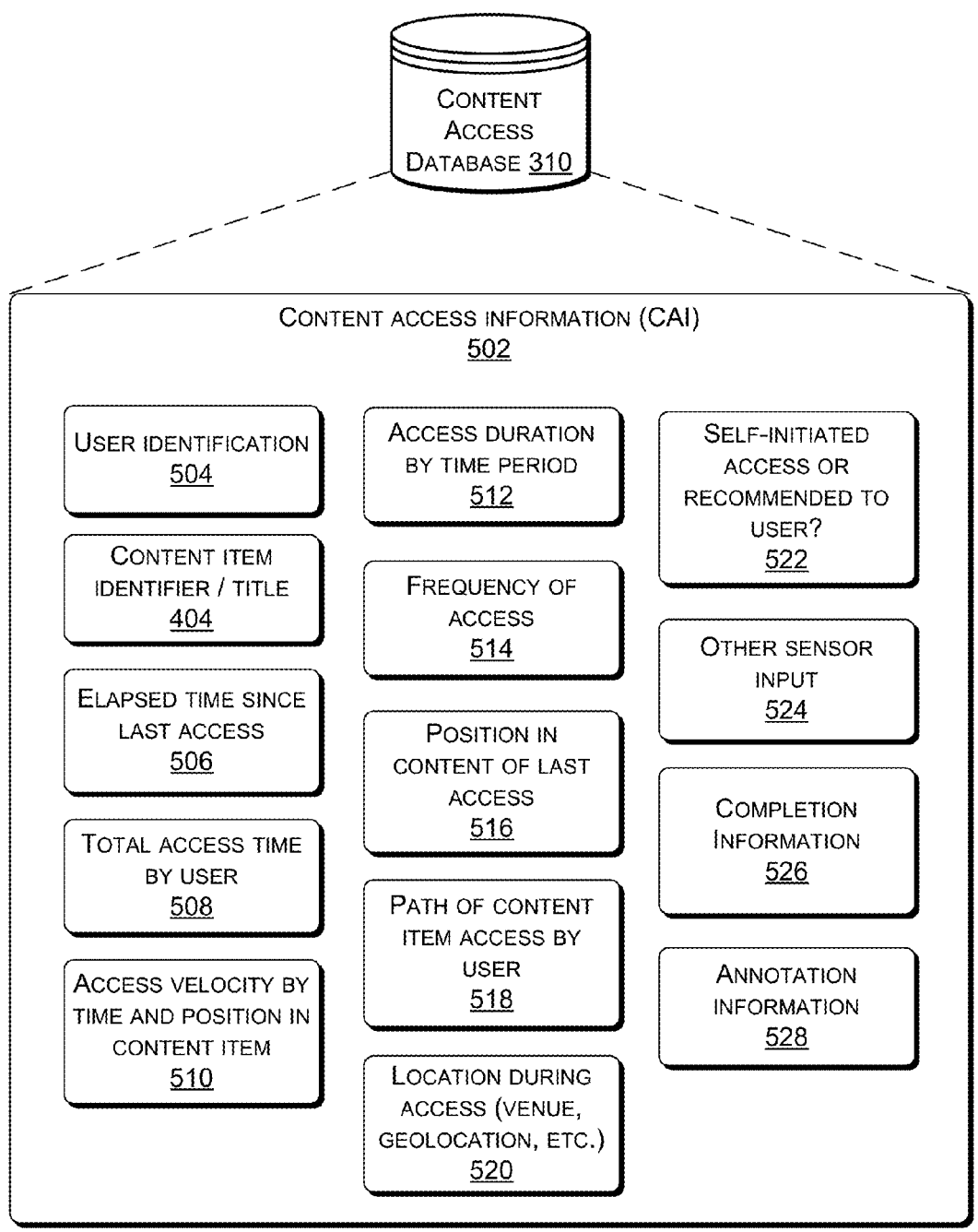
FIG. 5 shows an illustrative content access database of FIG. 3, which may be used to store content access information.

FIG. 5 shows an illustrative content access database 310 of FIG. 3, which is configured to contain the content access information 502. The content access information 502 may be derived from the CAEs 206. For discussion purposes, the content access information 502 may include the following:

- A user identification 504, allowing association of a particular user with a particular set of content access information.
- A content item identification 404, as described above.
- Information element 506 pertaining to an elapsed time since last access. In one implementation, access may be defined as a user interacting with the content item such that minimum duration thresholds are exceeded. For example, access to a book may be defined as two page turns in over ten seconds, to minimize erroneous data from inadvertent interaction such as incorrectly selecting a book.
- A data element 508 that relates to a total access time of the content item by the user.
- An access velocity 510 (a rate of item consumption per unit time) by time and/or position in the content item. For example, the user read 113 words per minute in chapter 3.
- An access duration by time period 512. For example, the user read for 37 minutes on April 1. This access duration by time period 512 may be for a single content item or for all content items accessed by a user during a specified time period.
- A frequency of access 514. For example, how often a content item is accessed.
- A position in content of last access 516. For example, the position in content of the last access was 237 words into chapter 5.
- A data item 518 pertaining to the path of content item access by user. For example, a path may track as the user skips from chapter 1 to chapter 5, then back to chapter 3, and then switched to another book, and finally returned to read chapter 7.
- A location during access 520. Locations include venues such as airplanes, night clubs, restaurants, etc., specific geolocation such as 48.93861° N 119.435° W, or both. For example, the user 102 accessed content item 108 from access device 104 which was located in Trafalgar Square.
- Information element 522 directed to whether initial access to the content item was self-initiated or the result of a personal or automated recommendation to a user.
- Data derived from other sensor inputs 524, such as an accelerometer or ambient light sensor. For example, accelerometer input may provide data indicating the user reads while walking. In another example, ambient light input in conjunction with other CAI may indicate that users have a greater rate of abandonment when reading in low light levels.
- Completion information 526, indicating whether the content item has been completed. Completion of an item may be evaluated using various different criteria, such as whether the user has reached the last page of an eBook or has sequentially navigated through a majority of a content item.
- Annotation information 528, such as annotations made by users. Annotations can be in the form of notes, highlights, bookmarks, etc.

Figure 6:
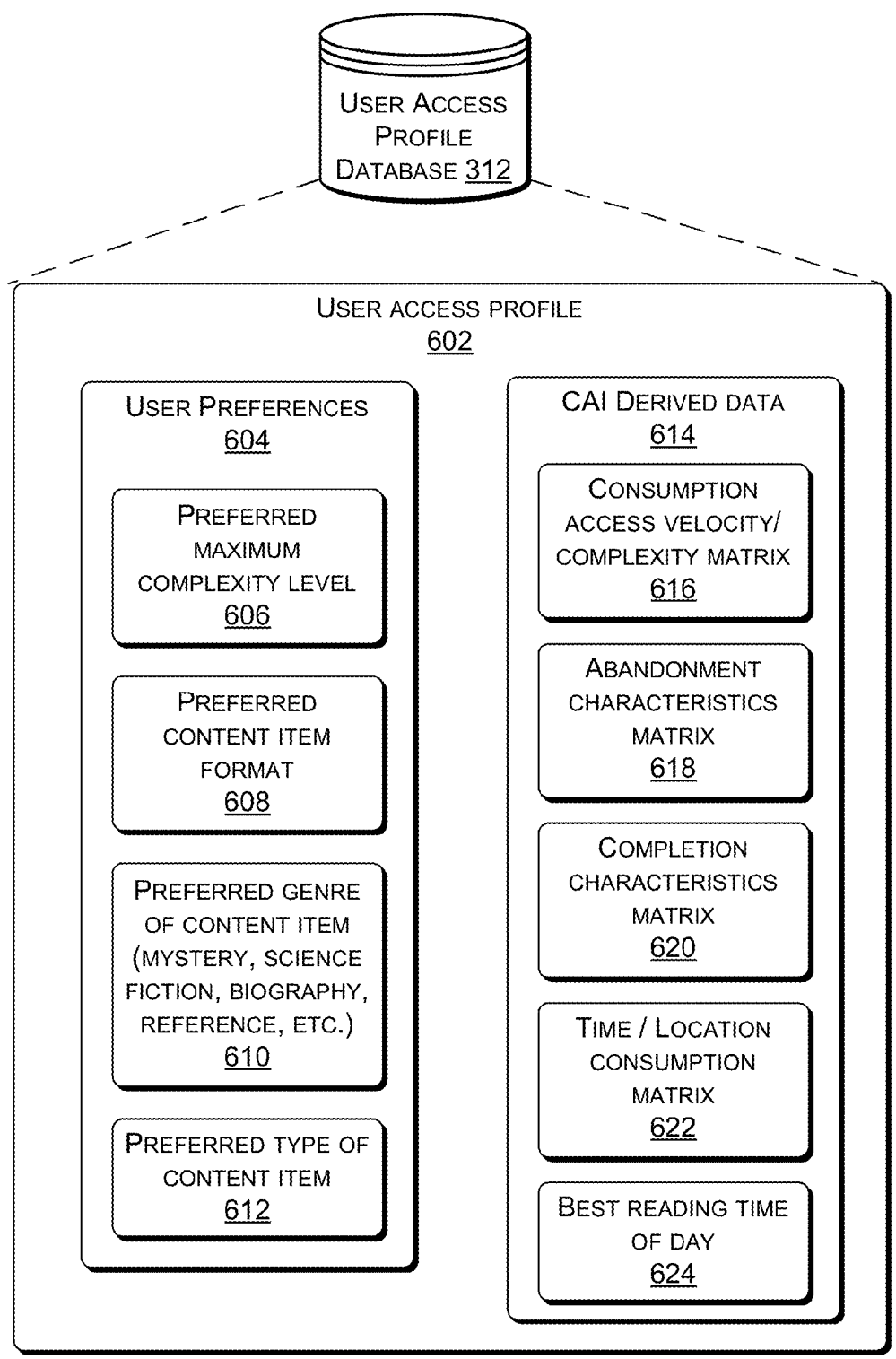
FIG. 6 shows an illustrative user access profile database of FIG. 3, which may be used to store user access profiles.

FIG. 6 shows an illustrative user access profile database 312 of FIG. 3, which is configured to contain a user access profile 602. User access profile 602 may include a variety of information about the user and their preferences. For discussion purposes, the user access profile 602 may include user preferences 604 that have been explicitly entered by a user or derived from other user data. Further, such preferences 604 may be inferred over time from the user's behavior, or from examining behavior of other users who are deemed to be similar to the user. These user preferences 604 may include the following:

- A preferred maximum complexity level 606. For example, the user prefers content items not exceeding a grade 16 reading level.
- A preferred content item format 608. For example, the user prefers to use the text-to-speech function, largest font available, etc.
- A preferred genre of content items 610, such as mystery, science fiction, biography, horror, reference, etc.
- A preferred type of content item 612, such as text, audio, video, etc.

The user access profile 602 may also include CAI derived data 614 which has been derived from CAEs 206. For discussion purposes, CAI derived data 614 may include the following:

- A consumption access velocity/complexity matrix 616. For example, a user (or group of users) may have a matrix describing the relationship between access velocity and complexity. Thus, the user (or group of users) may exhibit a high access velocity (such as 350 words per minute) with low complexity content items such as a brochure, but may exhibit a low access velocity (such as 100 words per minute) for a high complexity content item such as a math treatise.
- An abandonment characteristics matrix 618. This matrix would characterize a relationship for a user (or group of users) between consumption statistics and abandonment of the content item.
- A completion characteristics matrix 620. This matrix would characterize a relationship for a user (or group of users) between consumption statistics and completion of the content item.
- A time/location consumption matrix 622 similar to the previous matrices. The time/location consumption matrix 622 establishes a relationship between clock time and location (such as venue or geolocation) and consumption of content. For example, a user may have the most uninterrupted time to read from 7 a.m. to 8 a.m. while on the train.
- A best reading time of day 624. For example, a user may exhibit a personal highest average access velocity during 8 a.m. and 9 a.m. local time.

User Interaction FIG. 7 shows an illustrative process 700 of monitoring completion of content items and of providing or recommending additional content or information in response to the completion. The process 700 (as well as processes 800, 900, 1000, and 1100 in FIGS. 8-11) is illustrated as a collection of blocks in a logical flow graph, which represent a sequence of operations or operational logic that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. Unless stated otherwise, the order in which the operations are described is not intended to be construed as a limitation, and any number of the described blocks can be combined in any order and/or in parallel to implement the process. For discussion purposes, the process will be described in the context of the architecture of FIGS. 1-6, in which the illustrated operations are performed under control of a device such as an electronic book reader device, which stores and executes instructions that implement the described functionality.

At 702, a particular content item is rendered for consumption by a user. Many content items have sequential portions, such as pages, chapters, episodes, tracks, scenes, etc., that are rendered in a natural order. Content items may be rendered in various ways, including by displaying content, playing audio or video content, or otherwise converting the item into a human perceptible form. In many cases, the user is also allowed to navigate arbitrarily within or between portions of the content item.

At 704, the user's interaction with the content item is monitored. In the described embodiment, monitoring 704 comprises receiving content access events (CAEs) indicating interactions by a user with a content item.

At 706, the completion of a particular content item, such as an eBook, by a user is determined, detected, or otherwise identified. In the embodiment described herein, completion can be inferred from CAEs that are received during user interaction with content items via the access devices 104(1), ..., 104(N). For example, a particular CAE may indicate that a user has closed a content item after navigating to its last page. This information might be used as the basis for concluding that the user has completed the content item. Alternatively, a CAE might indicate explicitly that the user has completed the content item.

Determining whether a particular content item has been completed can be accomplished using various criteria. In the context of eBooks, for example, the following are some examples:

The user reaches the last page of an eBook.
The user navigates essentially through the majority or a threshold amount of the eBook, concluding a page near the end of the book.
The user navigates sequentially through the last few pages of an eBook, including the last page.
The user reaches the last page of an eBook and navigates away from the eBook.
The user reaches the last page of an eBook and remains there for an unusually long time.

For other content items, analogous process of monitoring user interaction through the content item may be used.

In some cases, such as when a content item has an appendix or other secondary matter following the primary content, the "end" of the content item may be ambiguous. This can be dealt with in different ways, depending upon implementation or upon preferences specified by a user. For example, some implementations may deem completion of a book upon reaching the end of the primary content, regardless of whether appended secondary matter has been consumed. Other embodiments may not deem a content item as being completed unless the user has navigated to the end of any secondary matter.

In some embodiments, the user may be prompted to confirm completion, and completion may be deemed to have happened only upon user confirmation or some other explicit user indication.

Note that different embodiments may use different mechanisms for detecting completion of content items by an accessing user. One embodiment might include comprehensive user activity monitoring by receiving CAEs, as described above, in which completion is inferred or detected based on various different types of user activity information. Other embodiments may be implemented without such comprehensive user activity monitoring. For example, a particular reader device or program might be configured to simply notify or report when a user has reached the end of the content item or has navigated away from the end of the content item.

Subsequent actions shown in FIG. 7 may be performed in response to the completion 706 of the particular content item.

An action 708 comprises predicting, identifying, receiving and/or retrieving additional related products, such as information items, suggested content, supplemental items, resources, and/or other data that a user might find useful or desirable after completing the particular content item. As indicated within a bracket to the right of block 708, this might include supplemental resources, merchandise other than content items, and other content items that are related in some way to the just-completed content item. In some embodiments, action 708 comprises predicting and recommending one or more suggested eBooks that a human reader would be likely to read after completing the content item. In other embodiments, action 708 might comprise predicting one or more products, merchandise, or resources that the user might be likely to obtain after completing the content item, and recommending those products, merchandise, or resources to the user.

Supplemental resources might comprise one or more of various types of content, such as blogs, web pages, stores, content sources, and other things related to the content item that was just completed, including, for example:

A blog or blog entry written by the author of the completed content item.
Reviews of the completed content item.
Web-based content related to the subject matter of the completed content item.
A website associated with the completed content item or its author.

The items enumerated above are merely examples of possible resources and content that might be available for presentation on a user's device, and are not intended to be all-inclusive. Generally, supplemental resources may include any type of information, compilation, website, web page, or other content that can be presented or made available to a user through the user's access device, such as device.

The additional related information identified at 708 may also comprise listings of or links to on-sale merchandise other than content items. Different types of non-content items might be identified that have some relation to the completed content item. If the completed content item relates to baseball, for example, such merchandise might consist of baseball memorabilia. Other types of merchandise might relate directly to storylines, such replicas of items described in the completed content item or used by story characters in the content item.

The additional related information identified at 708 may also comprise related content items such as eBooks. For example, content items by the same author or authors might be identified as being related to the just-completed content item. Similarly, different content items might be considered to be related by virtue of common authorship; common genre; common topic or subject matter; common characters; common writing style; belonging to a common set or series of related works such as a trilogy; and so forth.

Related content items might also be identified based on observations of the user's past behavior or of the behavior of other users when completing this particular content item or some other version or form of the particular content item. For example, it may have been observed that a certain user often opens or searches for books by the same author after finishing a book. If so, action 708 might comprise identifying such other books by the same author. In other embodiments, it might be observed that users who liked a particular book also enjoyed certain other books. Whether a user liked a book might be evaluated based on explicit ratings by the user, or by the user's engagement with the book, such as whether the book was consumed in a relatively small number of sittings or whether the user made a large number of annotations or highlights in the book. After identifying a set of users who liked the book, other books might be identified based on similar factors, such as by identifying books in which these users had similar experiences or usage patterns. For example, some embodiments might select other users who gave the book high ratings, and select other books that were also rated highly by those users. As another example, some embodiments might select other users having a particular usage or engagement pattern (high reading speed, large numbers of annotations, etc.), and identify books in which those same users demonstrated similar usage or engagement patterns.

In yet another example, an embodiment might select users who enjoyed content items of a similar type or having similar characteristics, such as being of a particular length or reading level, and recommend other content items having those same characteristics. Alternatively, works having opposing or alternative viewpoints or positions might be recommended in some situations.

It might also be noted that a large number of users, after completing a particular book, begin reading a specific other book. In this case, action 708 might comprise identifying one or more content items that are often selected or obtained by other users upon completing the same book (or another version of the same book) that the user has just completed. In the case of some content items, there may be a logical sequential relationship, such as with a series of textbooks or other content series. In these situations, action 708 may comprise identifying such next logical content item in the sequence or series.

Additional related content items and other information can also be identified, predicted, or refined based on more general comparisons of the completing user to other users having similar likes and dislikes, as evaluated from their past activities.

The identification of related information can also be guided or filtered based on information known about the preferences and characteristics of the user who just completed the content item and upon particular circumstances of the user at any particular moment, as discussed above with reference to the recommendation module 326 of FIG. 3. The identification of related information may consider past behavior or habits of the user as gleaned from content access information. It may also consider time to complete, user profiles, and other metrics that may be available. The user may also be given the ability to specify different types of recommendations that they would like to receive. For example, some users may be interested in seeing recommendations for related works, but may not want to see recommendations based on the activities or preferences of other users.

Recommendations and related information can also be formulated based on the location and or venue at which the user is located, or upon scheduling information that may be available to the access device or the CUARS 112. For example, recommended content items might relate to the location or venue at which the user is currently located. Furthermore, recommendations might include references to nearby points of interest or retail locations.

Further techniques for identifying and presenting related content items and other information, which can be used in conjunction with the techniques described herein, are described in subsequent sections of this discussion.

After identifying related and/or supplemental information that might interest a user after completing a particular content item, an action 710 comprises offering or presenting this information, to the user who just completed the content item. The information might be presented in different ways, including by listing the information, automatically initiating certain information such as opening the first page of a subsequent or suggested content item, or initiating a preview of a subsequent or suggested content item.

In some embodiments, action 710 might comprise offering or listing one or more suggested eBooks for subsequent selection, purchase, consumption, or reading by an accessing user or reader. In other embodiments, action 710 may comprise offering or listing other types of goods, merchandise, and/or services. Furthermore, action 710 might comprise presenting information allowing the user to share completion information regarding the completed content via a social network associated with the accessing user.

The information identified at 708 might be presented in action 710 as a compilation or list of links and references to the identified supplemental information, resources, merchandise, content items, etc. Each link or reference might be introduced or explained in terms of its relationship to the just-completed content item. Alternatively, certain supplemental information may be displayed to the user explicitly.

FIG. 7 includes a conceptual example of how such information might be listed or presented in an "End of Book Recommendations" dialog 712. This example assumes a reader has just completed a book called "The Hobbit," by J. R. R. Tolkien.

The dialog 712 includes several different suggestions of things the reader might be interested in seeing or purchasing. A suggestion 714 comprises a link to another book that is a sequel to the book that was just completed. In this example, the sequel is titled "The Lord of the Rings: The Fellowship of the Ring," also by J. R. R. Tolkien, and is formatted as an actionable link. Clicking this link may take the user to a web page or other presentation in which the sequel is described and offered for preview or sale. Alternatively, selecting this link may automatically open the sequel to its first page, for immediate consumption by the user. In this latter situation, the reader may be delivered the full eBook of "The Lord of the Rings: The Fellowship of the Ring," while charging the reader's account. Or, a free sample of the eBook may be delivered automatically for the reader to consider for purchase.

A suggestion 716 comprises a link to a website associated with the author of the book that was just completed. Selecting this opens the indicated website. Similarly, links to other websites associated with the content item or its author might be listed, such as a link to an online discussion regarding the book that was just completed, or a link to an online wiki entry describing the book or its author.

A suggestion 718 is a link to another content item that was chosen by other readers upon completion of "The Hobbit." Opening this link may take the user to a web page or other presentation in which the related content item is described and offered for preview or sale. If the content item is not available electronically, it may be offered in a physical format such as a paper book or physical DVD. This suggestion may also be based on identifying other readers who exhibit similar reading habits or characteristics as the current reader. Once similar readers are identified, items that these readers have consumed may form the basis for such suggestions or recommendations.

Suggestions 720 comprise links to non-content merchandise that has some association with the book that was just completed. Selecting any of these links might take the user to websites or other presentations describing and offering the listed merchandise for purchase.

Suggestions 722 comprise actions that a user might take to report the completion of the content item on various available social networking sites or to share completion information via such sites. In this example, selecting "FaceBook" might automatically post a message to the user's FaceBook® account, stating that the user has completed this particular content item. Selecting "Twitter" might post a similar notification on the Twitter® service. In some embodiment, a user may be able to configure his or her device to automatically make such postings upon item completion. In other embodiments, selecting either of these options might simply take the user to the respective websites of the social networking services, where the user might create his or her own postings regarding the completed content item.

Suggestions 722 might also comprise links or references to active discussions about the content item on different social networking sites.

Dialog 712 may be presented as a pop-up user interface element when the user completes a content item. Alternatively, dialog 712 may be implemented as a displayed local page or web page. Furthermore, the information of dialog 712 may be appended as a page in the just-completed content item.

Rather than providing dialog 712, action 710 may automatically initiate a content item that is deemed to be closely related to the item that was just completed. For example, rather than referencing or linking to a sequel, the sequel might be automatically downloaded and opened to its first page, so that a reader can continue reading without significant interruption. Furthermore, action 710 may comprise initiating a free preview of at least one of the content items identified at 708.

User Metric Generation

Figure 8:
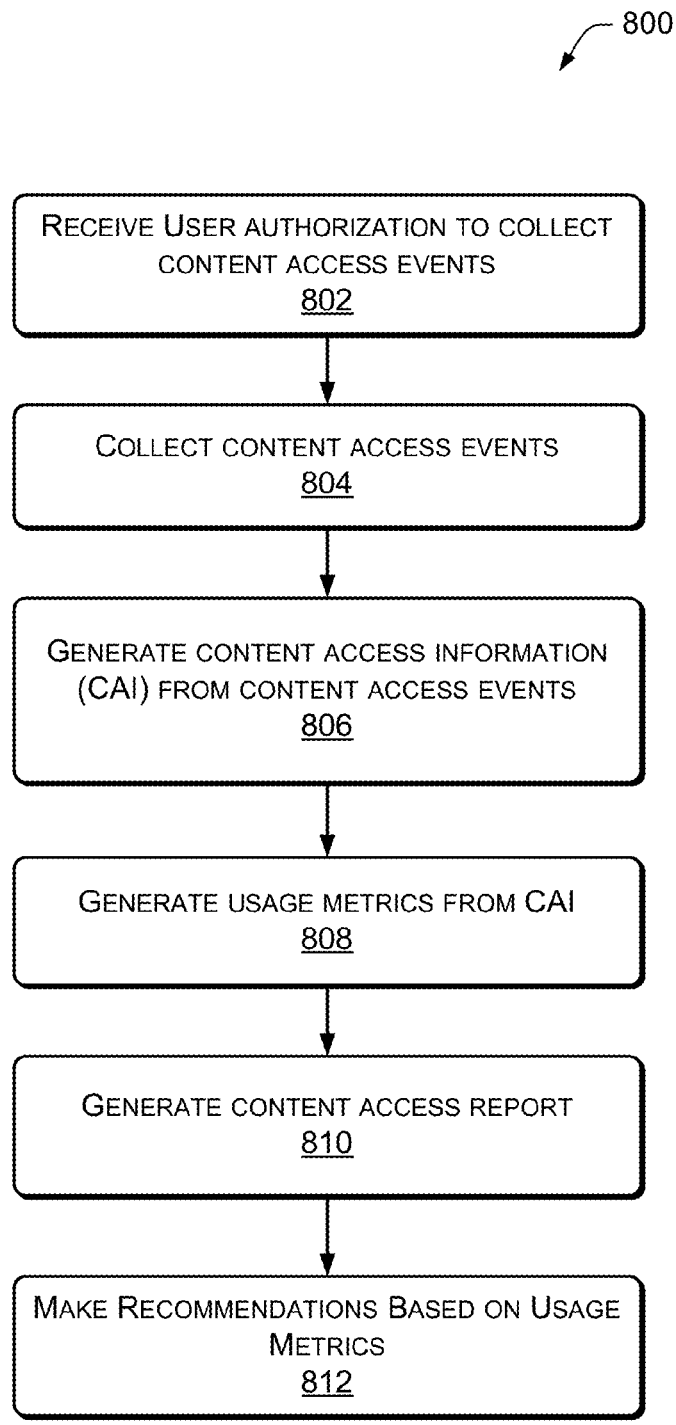
FIG. 8 is flow diagram of an illustrative process of collecting content access information about a content item.

FIG. 8 shows an illustrative process 800 of producing metrics that describe user interactions with content items. Such metrics can be used to identify or filter the additional information that will be presented to a user upon completion of an item. More specifically, the additional information may be identified or filtered based upon an analysis of previous user interactions with the just-completed content item and previously consumed content items. This process may, but need not, be implemented using the architecture shown in FIGS. 1-6.

At 802, there is an initial receipt of user authorization to collect content access events (CAEs) as the user accesses content items using an access device 104. This authorization may be granted in many ways, including both implicit and explicit techniques. As one example, a user may presented with, and explicitly agree to, terms of use when acquiring rights to access a content item that include authorization to collect CAE data.

At 804, the CAEs are collected. In one implementation, the CAEs are captured by, and stored at, the access device 104, as shown in FIG. 2. Once captured, the CAE data may be transferred to the content usage analysis and recommendation service (CUARS) 112 over the network 118. Alternatively, if access devices are accessing the content items via the servers 110(1), ..., 110(S), the CUARS 112 residing on the servers 110(1), ..., 110(S) may directly collect CAEs. The type and number of CAEs collected are configurable parameters.

At 806, content access information (CAI) is generated from the CAEs. As an example, suppose an access device 104 collects CAEs in the form of an identification of a content item and a timestamp of each presentation of that content item to the user. These CAEs may then be consolidated into CAI that defines a frequency-of-access statistic 514 for a particular content item. As another example, the path of content item access by a user 518, access velocity by time and position in the content item 510, and other information in content access database 310 may be derived from CAEs 206. There are many other ways to derive content access information from a collection of CAEs.

At 808, reportable usage metrics may be developed from the CAI. Such metrics may include the raw CAI or CAEs, as well as other metrics derived from the raw CAI or CAEs, but converted to an easy to understand parameter that may be reported to the user. For instance, the usage metrics may include performance metrics, such as reading rate (how fast/slow one reads based on page turning rate, access velocity, etc.), complexity level, acceleration or deceleration during consumption of a content item, chapter sequence, completion status, and so on.

At 810, content access reports may be generated to present the content usage metrics to the user. These reports, illustrated as reports 114(1)-(R) in FIG. 1, may describe an individual user or group of users 102(1)-(U). That is, the reports may include individual metrics (e.g., reading rate, access velocity, access path through content items, etc.) and/or group statistics and how individual users compare to the group.

At 812, recommendations may be made to the user based on the usage metrics. As described above, such recommendations can be offered as further, related information when a user finishes a particular content item.

There are many different types of recommendations that can be generated by the service 112 based on the gathered statistics. As one example, recommendations may be made to certain portions of a particular content item, and an order in which to consume those portions. As another example, recommendations may be made to consume other content items. For instance, the service may determine other content items that seem suitable for a reader who exhibits a certain reading rate or subject matter complexity level. As still another example, recommendations may take suggest one or more services to try. For instance, suppose an adult user exhibits a below normal reading rate. In such situations, a recommendation may be made to seek out a reading service for speed reading techniques. Recommendations for activities may also be generated based on content usage metrics. For instance, if the user consistently accesses content pertaining to mountain climbing, a recommendation may be made to join a local mountain climbing organization or register for an upcoming trail hiking event.

Recommendations may further include or propose specific advertisements. For the user interested in mountain climbing, for example, an advertisement to an outdoor equipment company may be provided with the recommendations.

Although not shown in FIG. 8, content items being suggested to the user may also be filtered according to one or more of the factors described above. For instance, content items may be filtered according to reading rates, subject matter complexity level, access patterns, and so forth.

Certain specific processes are described below to provide example scenarios in which usage metrics are used to determine item recommendations that may be presented to a user upon item completion. These are non-exhaustive processes, but intended to provide examples of features provided by the architecture described herein.

Recommendations Based on Available Time

One example scenario concerns the situation where a user may only have a limited amount of available time to consume a content item. For example, a user may be travelling and have two hours to read while on a plane.

Figure 9:
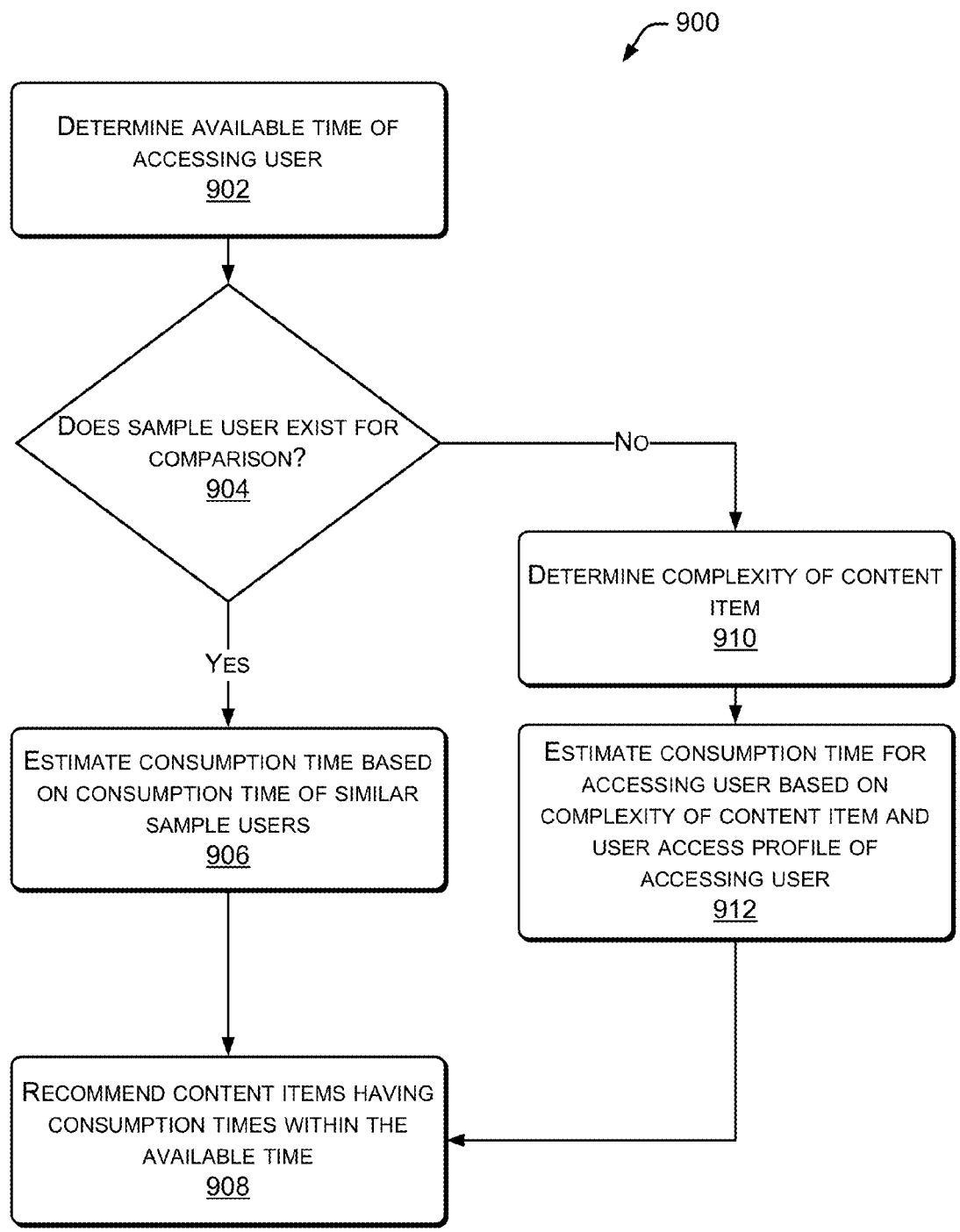
FIG. 9 is flow diagram of an illustrative process of recommending content items or portions of content items to a user based on available time the user has to consume content.

FIG. 9 shows an illustrative process 900 of recommending content items or portions of content items to a user based on available time the user has to consume content. The process 900 will be described in the context of the architecture of FIGS. 1-6 for convenience and clarity. Access device 104, CUARS 112, or a combination of the two may implement this process.

At 902, available time for an accessing user is determined. Generally, this involves either asking the user for how much time is available for a particular session, or determining the available time automatically by checking the user's calendar or itinerary. A more detailed discussion is provided next with respect to FIG. 10.

At 904, a determination is made as to whether a sample user exists from which to derive a comparison. Identifying sample users may be accomplished in various ways. In one approach, the process may determine whether a user access profile 602 (or profiles) exists for a sample user who has consumed the content and has characteristics similar to the accessing user. For instance, similarity may be determined by selecting user access profiles that have attributes such as user preferences and CAI derived data that are within a pre-determined threshold of one another. If the pre-determined threshold is 11%, for example, a first user with an access velocity of 200 words per minute may be considered similar to a second user with an access velocity of 213 words per minute. The thresholds may be set, or alternatively modified automatically over time, allowing the thresholds to be different for various user comparisons. In other implementations, similarity with sample users may be determined using characteristics such as demographic, educational background, etc. In another implementation, finding other sample users may be based on user behavior, such as purchase histories, viewing patterns, and so forth. Identifying sample users may further be based on collaborative filtering or people-based clustering techniques.

When a sample user exists (i.e., the "Yes" branch from 904), consumption time of the accessing user is estimated based on the consumption time of the sample user at 906. Once consumption time is estimated, at 908, content items having estimated consumption times within the available time are recommended to the accessing user.

Returning to 904, if no sample user exists (i.e., the "No" branch from 904), complexity of the content item is determined to ascertain the relative intricacy of the content item at 910. At 912, consumption time is estimated based on the complexity and the user access profile of the accessing user. Then, at 908, content items having suitable estimated consumption times are recommended to the accessing user.

Figure 10:
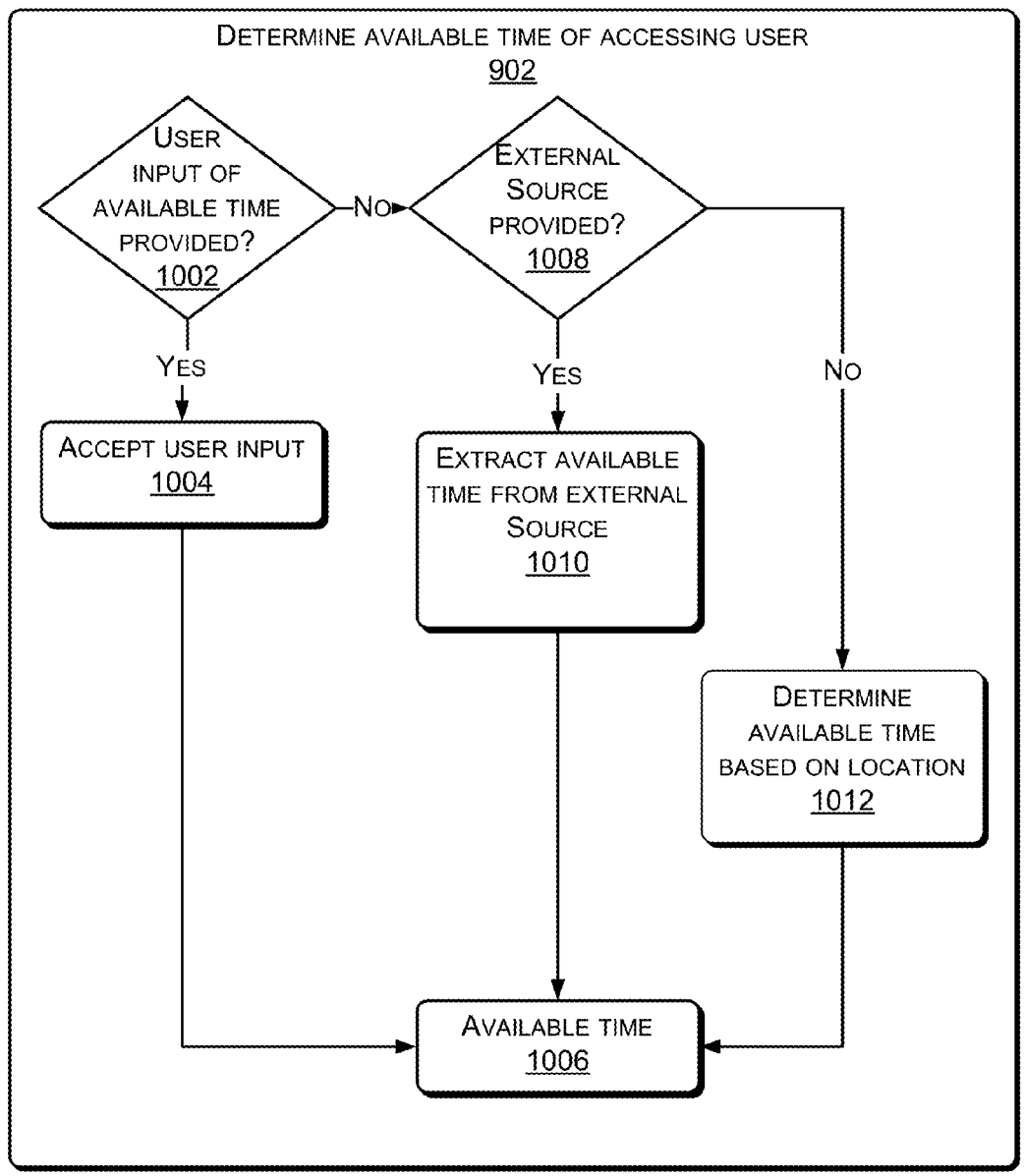
FIG. 10 is flow diagram of an illustrative process of determining available time of a user.

FIG. 10 illustrates a more detailed process for the act 902 of determining available time of an accessing user. The process 902 may be performed, for example, by access device 104, CUARS 112, or a combination of the two.

At 1002, a determination is made whether the user has affirmatively input available time for a session. For instance, a prompt may be presented to the user asking how long the user has available to enjoy a content item. Alternatively, the user may specify in his user profile a default of one hour session times when traveling, as determined by the access device being located in an airport or train depot, or being ported on a known daily commute.

If user input of available time is provided (i.e., the "Yes" branch from 1002), the user input is accepted at 1004. At 1006, the available time is determined to be that which the user has specified.

On the other hand, if no user input of available time is provided (i.e., the "No" branch from 1002), the access device determines whether this information can be obtained automatically from an external source at 1008. For instance, the access device may check the user's calendar, or an electronically available itinerary. For instance, the flight schedule may be uploaded manually by a user, to the access device (or CUARS 112) or may be determined automatically based on, for example, connection to a wireless access point associated with the flight. Alternatively, the user profile may include a typical commuting route that the access device may be able to confirm as the user commutes to work.

If available time may be extracted from an external source (i.e., the "Yes" branch from 1008), the available time information is extracted from the external source at 1010. For example, the accessing device may parse an airline flight schedule to determine duration of flights and layovers, or extract calendar events from the user's calendar. At 906, the extracted available time is used as the available time.

If, however, no external source is provided (i.e., the "No" branch from 1008), available time may be determined based on location at 1012. For example, when the location is a hotel and there is minimal change in geolocation, available time may be determined to be a pre-determined value, such as five hours. At 1006, the determined time is used as available time.

Figure 11:
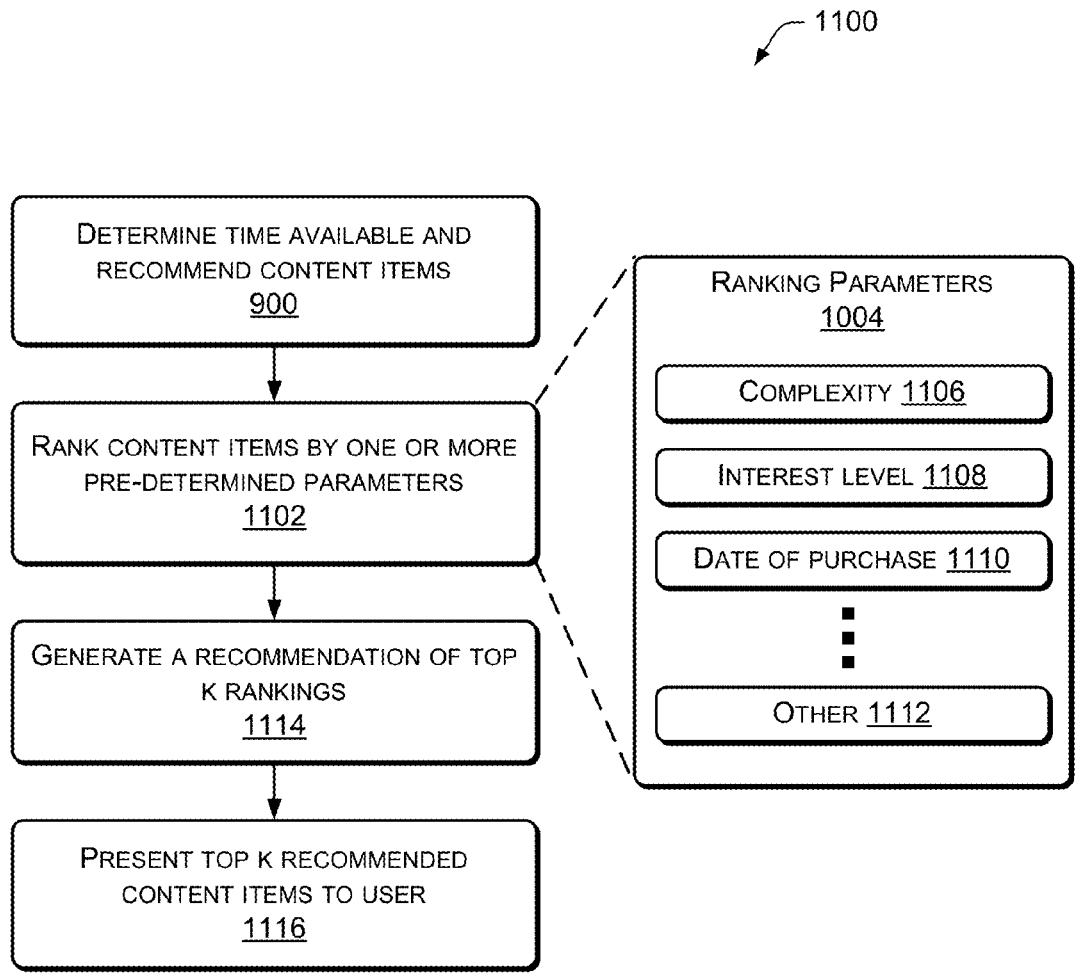
FIG. 11 is flow diagram of an illustrative process of recommending ranked content items or portions of content items for consumption when available time is limited.

FIG. 11 shows an illustrative process 1100 of recommending ranked content items or portions of content items for consumption when available time is limited. This process 1100 is useful for scenarios in which, due to limited available time, users may wish to only consume content items or portions of content items considered to be critical. For example, with only a few hours to prepare before a literature examination, a student user may wish to read only highly annotated or frequently cited portions of a book. As above, the process 1100 will be described in the context of the architecture of FIGS. 1-6 for convenience and clarity.

The process 1100 begins by executing the process 900 of FIG. 9 to determine time available for the user to consume content, and generating recommendations of content items or portions of content items suitable for that time. At 1102, content items having consumption times within the available time are ranked by one or more pre-determined parameters. A set of ranking parameters 1104 are illustrated, including: a complexity 1106 of the content item, an interest level 1108 of a user (e.g., personal ranking of what content items to consume), a date of purchase 1110, and other parameters 1112 (e.g., estimated time to complete, related content items, quantity of highlights, genre, user ratings, popularity, sales data, reviews, etc.).

At 1114, a recommendation of a top k ranked content items is generated, where k may be pre-determined. For example, the top ten ranked items may be provided, or the top ten percent of ranked items.

At 1116, the top k recommended content items are presented to the user. The user may then select which of the recommended content items they wish to consume given their limited time.

Recommendations Based on Presentation Mode

Access devices may provide a variety of different presentation modes for content. For example, a book may be converted from text to audio using a text-to-speech (TTS) engine on the access device. Described next is a process of recommending to a user that another version of a content item is available, for example an audio book version of a text book. Such a recommendation may be made to a user after completing a particular content item, as described above.

Figure 12:
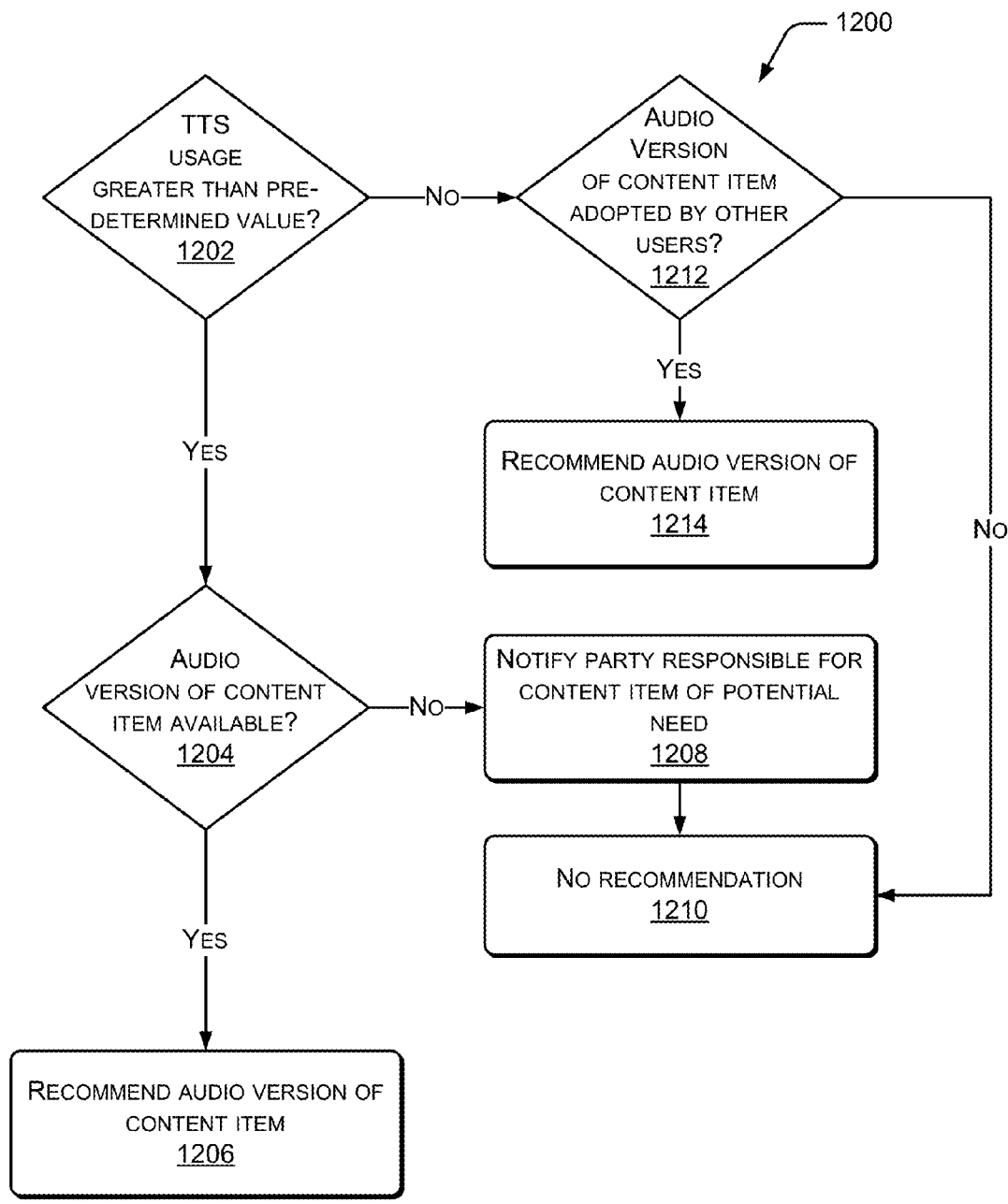
FIG. 12 is flow diagram of an illustrative process of recommending an audio version of a text-based content item.

FIG. 12 shows an illustrative process 1200 of recommending an audio version of a text-based content item. At 1202, a determination is made whether TTS engine usage is greater than a pre-determined value. The pre-determined value may be based on available CAI, such as frequency of access, duration of access, and so forth. A user, publisher, content provider, or other party may set this pre-determined value. For example, a user may set the pre-determined value to twenty minutes per content item, or per day, etc.

When use of the TTS engine is greater than the pre-determined value (i.e., the "Yes" branch from 1202), another determination is made as to whether an audio version of the content item being accessed is available at 1204. When an audio version of the content item being accessed is available (i.e., the "Yes" branch from 1204), at 1206, a recommendation for the audio version may be generated and presented to the user.

Returning to 1204, when no audio version of the content item being accessed is available (i.e., the "No" branch from 1204), a notification may be sent to a responsible party (e.g., publisher, distributor, author, etc.) indicating a potential need for an audio version at 1208. Since no audio version exists, there is no recommendation given at 1210.

Even assuming that the TTS engine usage is not greater than the pre-determined value (i.e., the "No" branch from 1202), the process 1200 may optionally evaluate whether other users have adopted an audio version of the content item at 1212. For instance, suppose the audio version has experienced wide spread popularity and the CUARS 112 decides to recommend this audio version to the user even if the user has not been using the text-to-speech feature of the eBook reader device. If a significant number of other users have consumed the audio version (i.e., the "Yes" branch from 1212), an audio version of the content item is recommended at 1214. Conversely, if an insignificant number of other users have consumed the audio version (i.e., the "No" branch from 1212), no recommendation is made to the user at 1210.

Variations of this process may be used for other presentation modes and alternative presentation modes. Alternative presentation modes include text-to-speech, large print, audio books, video, annotated versions, other languages, etc. may be recommended. For example, a user accessing a content item in a language foreign to them and who frequently accesses a language translation engine may be presented with a recommendation for a version of the content in their preferred language.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
under control of an electronic book reader device configured with executable instructions,
determining, based on user interaction data, completion of a particular electronic book by a human reader;
predicting one or more suggested electronic books that the human reader would be likely to read after completing the particular electronic book; and
in response to completion of the particular electronic book by the human reader, offering the one or more suggested electronic books for subsequent reading by the human reader, wherein at least one of the one or more suggested electronic books was obtained by one or more other human readers upon completion of the particular electronic book.

2. The method of claim 1, further comprising automatically initiating a free preview of at least one of the suggested electronic books.

3. The method of claim 1, wherein the suggested electronic books have one or more common characteristics with the particular electronic book, the common characteristics comprising one or more of authorship, genre, series, characters, setting, subject matter, and sequence.

4. The method of claim 1, further comprising filtering the one or more suggested electronic books based on one or more of the following:
whether the suggested electronic books have one or more of the same contributors as the particular electronic book;
whether the suggested electronic books have the same publisher as the particular electronic book; and
whether the suggested electronic books are of the same genre as the particular electronic book.

5. The method of claim 1, further comprising filtering the one or more suggested electronic books based on whether the one or more suggested electronic books comply with criteria designated by the human reader.

6. The method of claim 1, further comprising filtering the one or more suggested electronic books based on interests indicated by the human reader.

7. The method of claim 1, wherein the one or more suggested electronic books comprise a related electronic book that is subsequent to the particular electronic book in a series of related books.

8. The method of claim 1, wherein the one or more suggested electronic books comprise a related electronic book that is with the particular electronic book in a set of related electronic books.

9. The method of claim 1, further comprising, after determining completion of the particular electronic book based on the user interaction data, prompting to share completion of the particular electronic book via a social network.

10. A computer-implemented method comprising:
under control of one or more computer systems configured with executable instructions,
determining, based on user interaction data, completion of a particular content item by an accessing user;
identifying one or more products that are related to the particular content item, wherein the identifying one or more products comprises identifying one or more products obtained by one or more other users after completing a version of the particular content item; and
in response to completion of the particular content item by the accessing user, presenting the one or more products to the accessing user.

11. The method of claim 10, wherein:
the one or more products comprise a suggested content item; and
the presenting comprises initiating the suggested content item.

12. The method of claim 10, further comprising, after determining completion of the particular content item by the accessing user based on the user interaction data, sharing completion information regarding the particular content item via a social network associated with the accessing user.

13. The method of claim 10, wherein the one or more products comprise a suggested content item that is subsequent to the particular content item in a series of related works.

14. The method of claim 10, wherein the one or more products comprise a suggested content item that is with the particular content item in a set of related works.

15. The method of claim 10, wherein:
the one or more products comprise one or more suggested content items; and
the presenting comprises listing the one or more suggested content items for selection by the accessing user.

16. The method of claim 10, wherein the one or more products comprise merchandise other than content items.

17. The method of claim 10, wherein the one or more products comprise one or more suggested content items that are similar to the particular content item.

18. The method of claim 10, wherein the presenting comprises listing the one or more products for selection by the accessing user.

19. A system comprising:
a processor;
a memory accessible by the processor; and
operational logic stored in the memory and executable on the processor to perform actions comprising:
rendering sequential portions of a particular electronic content item in response to navigation by a human reader;
detecting completion of the particular electronic content item by the human reader; and
in response to completion of the particular electronic content item, recommending one or more other electronic content items to the human reader, wherein the recommending comprises:
querying the human reader for an available amount of time; and
in response to receiving the available amount of time from the human reader, identifying the one or more other electronic content items based on whether the one or more other electronic content items can be consumed within the available amount of time.

20. The system of claim 19, wherein the particular electronic content item and the one or more other electronic content items are selected based on one or more similarities between the content items.

21. The system of claim 19, wherein the particular electronic content item and the one or more other electronic content items belong to a set of related content items.

22. The system of claim 19, wherein the particular electronic content item is part of a series of related content items, and the one or more other electronic content items comprise a subsequent content item of the series.

23. The system of claim 19, wherein the recommending comprises automatically initiating the one or more other content items.

24. The system of claim 19, wherein the recommending comprises automatically initiating a free preview of the one or more other content items.

* * * * *